Aug. 10, 1965 W. P. ROWLAND 3,199,888
SNOW VEHICLE

Filed May 13, 1963 2 Sheets-Sheet 1

INVENTOR.
WILLIAM P. ROWLAND

BY *Peter L. Costas*

ATTORNEY

Aug. 10, 1965 W. P. ROWLAND 3,199,888
SNOW VEHICLE

Filed May 13, 1963 2 Sheets-Sheet 2

INVENTOR.
WILLIAM P. ROWLAND
BY
Peter L. Costas
ATTORNEY

United States Patent Office 3,199,888
Patented Aug. 10, 1965

3,199,888
SNOW VEHICLE
William P. Rowland, Southington, Conn., assignor to Rowland Products, Incorporated, Kensington, Conn., a corporation of Connecticut
Filed May 13, 1963, Ser. No. 279,909
15 Claims. (Cl. 280—18)

The present invention relates to snow vehicles, and more particularly to a novel toboggan of synthetic plastic sheet material.

In snow-covered regions, rescue work and logistics generally are often hampered by the difficulty in transporting empty snow vehicles to a given location in a short time. The need exists for a snow vehicle which may be conveniently carried in a compact form and readily placed in operating condition. Most desirably, the vehicle should be conveniently portable by one individual who may proceed at top speed to any location on skis or otherwise and which will provide the some effectiveness as a customary snow vehicle in transporting material or passengers.

It is an object of the present invention to provide a snow vehicle which may be quickly and readily compacted into a lightweight unit for portage and which may be quickly placed in operative condition.

Another object is to provide such a snow vehicle which is stiffened in the transverse direction and longitudinally flexible for compacting the vehicle.

It is also an object to provide such a snow vehicle having longitudinal flexibility for storage and which may be stiffened longitudinally when in use.

Still another object is to provide such a snow vehicle which may be fabricated easily and quickly from synthetic plastic sheet material for a relatively economical unit which may be handled easily and rapidly by a single person for transporting persons or material.

It is a further object to provide such a snow vehicle which may serve as an emergency shelter.

Other objects and advantages will be readily apparent from the following detailed specification and the attached drawings wherein.

Figure 1:
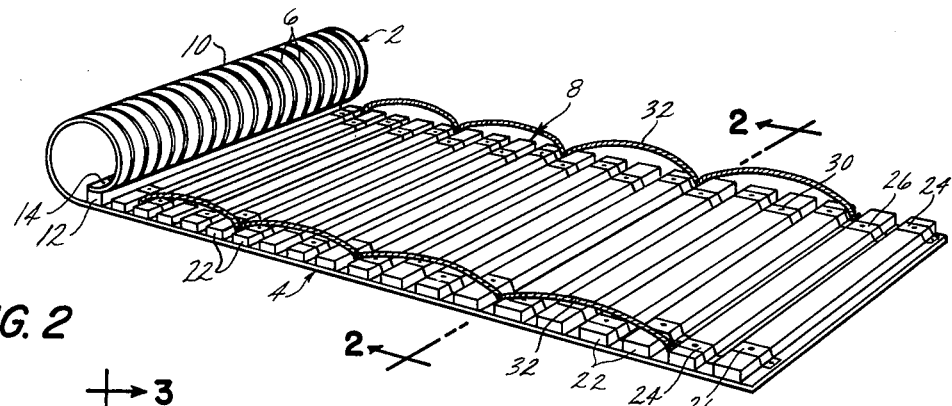
FIGURE 1 is a perspective view of a snow vehicle embodying the present invention.

It has now been found that the foregoing and related objects may be readily attained by a novel snow vehicle having a curved-up tip portion and an elongated body portion of synthetic plastic sheet material which has a relatively high degree of flexibility and impact resistance at temperatures below 0 degrees centigrade. A toboggan so constructed may be quickly and easily rolled up upon itself into a lightweight, compact unit for portage and readily flattened upon unrolling for use. To minimize sideward drifting of the vehicle while in motion and provide greater stability, the bottom surface of the body portion desirably is provided with a plurality of spaced-apart, longitudinally extending grooves.

To impart transverse rigidity to the snow vehicle without impairing its longitudinal flexibility and to protect persons or material located thereon, the body portion of the snow vehicle is most desirably provided with rigidifying means along the length of the upper surface thereof, including a plurality of relatively rigid stiffening ribs disposed transversely in longitudinally spaced-apart relationship. Additionally, the rigidifying means may include longitudinally extending removable stiffening members for imparting longitudinal rigidity to the body portion which may be removed to permit the snow vehicle to be rolled up for portage. To facilitate gripping by passengers or securing material thereto, the snow vehicle is provided with gripping means extending longitudinally along the sides of the body portion.

The curved-up tip portion may be integrally formed with the body portion and provided by reversely curving an end of the sheet material and fastening it to the body portion to provide a substantially cylindrical end portion, preferably with an interposed rigid buffer member, or by use of a rigid curvilinear element to which the plastic sheet material is secured.

The synthetic plastic sheet material utilized in the present invention should have a high degree of flexibility or bendability at temperatures below 0 degrees centigrade, and preferably below −30 degrees centigrade, to ensure its rollability and flattenability for the present invention. Moreover, it should have a high degree of impact resistance at temperatures below 0 degrees centigrade, and preferably below −30 degrees centigrade, to provide a tough unit which will resist injury during normal usage. Preferably, the sheet material should also possess a high degree of thermal and dimensional stability. Generally, the sheet material may be about 20 to 80 mils in thickness depending upon the physical properties of the resin, and preferably about 30 to 50 mils for most economical construction and convenient storage. Of the presently available synthetic resins, polycarbonates have proven highly advantageous because of their excellent flexibility and toughness even at temperatures below −60 degrees centigrade.

Referring now in detail to the drawings, FIGURES 1–5 illustrate one embodiment of a snow vehicle of the present invention having a curved-up tip portion generally designated by the numeral 2 and an elongated body portion generally designated by the numeral 4 and fabricated of synthetic plastic sheet material having a relatively high degree of flexibility and impact resistance below 0 degrees centigrade.

Figure 2:
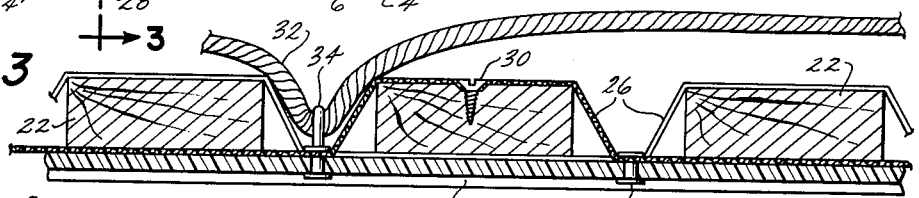
FIGURE 2 is a sectional view to an enlarged scale along the line 2—2 of FIGURE 1.

To minimize transverse sliding or whipping while the snow vehicle is in motion, the body portion 4 is provided with a plurality of longitudinally extending grooves 6 on its bottom surface as shown in FIGURE 2.

Figure 4:
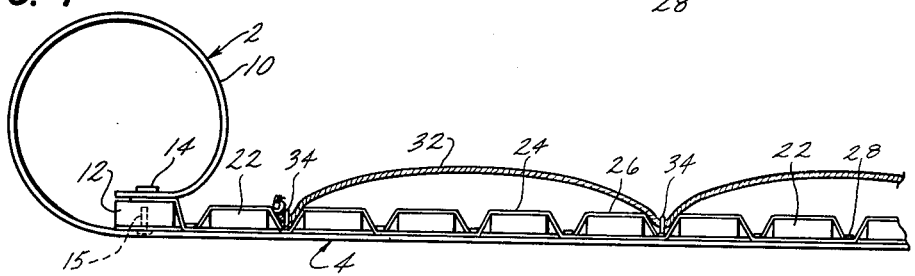
FIGURE 4 is a fragmentary side elevational view to an enlarged scale of the front end of the snow vehicle of FIGURE 1.

As best seen in FIGURE 4, the curved-up tip portion 2 and the body portion 4 of this embodiment are integrally formed from a single length of the synthetic plastic sheet material. One end of the sheet material is reversely curved back upon itself to form a substantially cylindrical end portion 10, the free end of which is secured to the rigid transverse bumper rib 12 by a plurality of fasteners 14 to provide a relatively strong, easily assembled curved-up tip portion 2. The transverse bumper rib 12 is secured in turn to the body portion 4 by a plurality of fasteners 15 having their lower heads recessed in the grooves 6 to reduce drag.

To protect material or personnel being carried upon the body portion 4, the snow vehicle most desirably includes rigidifying means generally designated by the numeral 8 extending along the length of the upper surface of the body portion 4 for providing rigidity to the body portion during use without interfering with the rolling of the snow vehicle upon itself for portage or storage.

Figure 3:
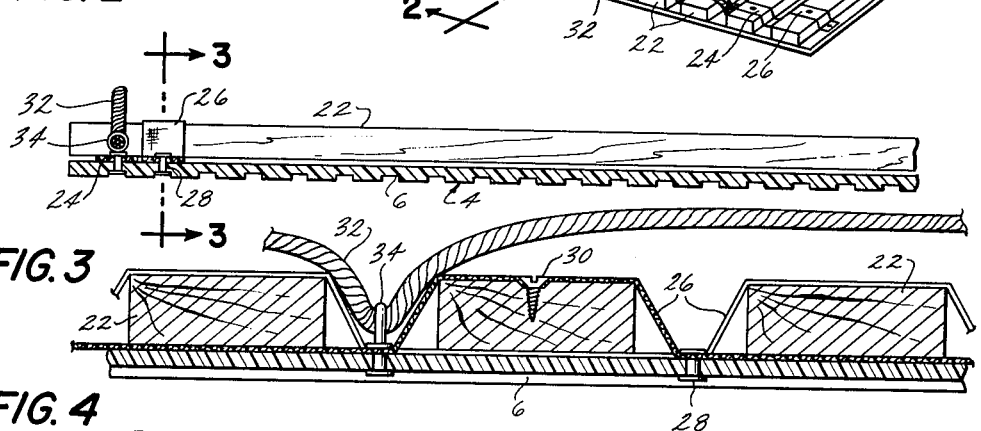
FIGURE 3 is a fragmentary sectional view to an enlarged scale along the line 3—3 of FIGURE 2.

To provide transverse rigidity without impairing longitudinal flexibility, the rigidifying means 8 includes a plurality of relatively rigid stiffening ribs 22 extending transversely of the vehicle in longitudinally spaced-apart relationship which are tied together into a flexible mat by a pair of ribbons 24, 26 of cloth or like material extending along each side of the body portion 4. As best seen in FIGURE 3, ribbons 24, 26 overlie alternate ribs and are secured to the body portion 4 by fasteners 28 disposed in the longitudinal spacing between the ribs 22. The lower heads of the fasteners 28 are recessed in the grooves 6 to reduce drag as best seen in FIGURE 2. The ribs 22 are restrained from lateral movement with respect to the ribbons 24, 26 by suitable fasteners such as the wood screws 30.

For the convenience of passengers and for securing cargo being transported thereon, the snow vehicle is provided with flexible handle means consisting of two lengths of rope 32 which extend longitudinally along the sides of the body portion 4 and are secured thereto at spaced intervals, conveniently by eye fastener portions 34 on the fasteners 28 as best seen in FIGURE 4.

Figure 5:
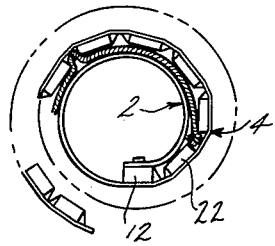
FIGURE 5 is a side elevational view of the snow vehicle of FIGURE 1 when rolled upon itself for portage.

As shown in FIGURE 5, the curved-up tip portion 2 serves as a core about which the flexible body portion 4 as well as the longitudinal flexible rigidifying means 8 and handle means may be readily rolled into a compact unit for portage or storage. Because of the nature of the plastic sheet material and the construction of the snow vehicle, it may be readily unrolled and flattened for usage.

Figure 6:
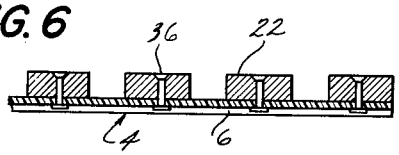
FIGURE 6 is a fragmentary elevational view of an alternative embodiment employing a different construction for mounting the rigidifying members.
Figure 7:
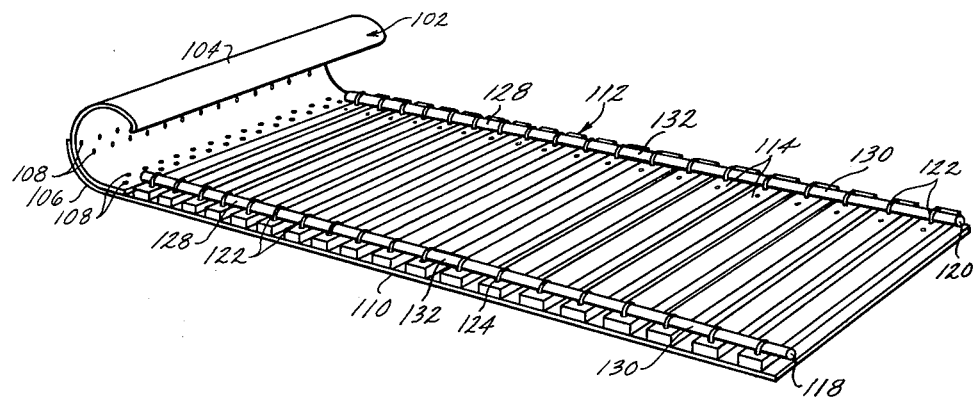
FIGURE 7 is a perspective view of another embodiment employing an alternative construction for the curved-up tip and incorporating longitudinal stiffening members.
Figure 8:
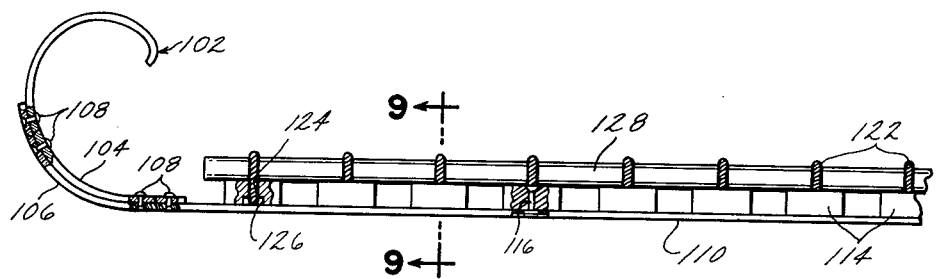
FIGURE 8 is a side elevational view to an enlarged scale of the embodiment of FIGURE 7.

In the embodiment of FIGURE 6, an alternative method of securing the ribs 22 to the body portion 4 is illustrated wherein fasteners 36 with lower head portions recessed in the grooves 6 secure each end of each rib 22 directly to the body portion. As will be readily appreciated, the ribs 22 may be bonded to the body portion 4 by a suitable adhesive to produce a composite action making possible the use of a somewhat thinner rib.

Referring now to the embodiment of FIGURES 7–10, the curved-up tip portion 102 is provided by a substantially rigid member 104 of generally curvilinear configuration to which the plastic sheet material 106 is secured by a plurality of fasteners 108. In this embodiment, the body portion 110 is stiffened both transversely and longitudinally during usage so as to provide greater protection for personnel or material being transported over rough terrain wherein the longitudinal deflection permitted by the embodiment of FIGURES 1–5 might be undesirable.

Figure 9:
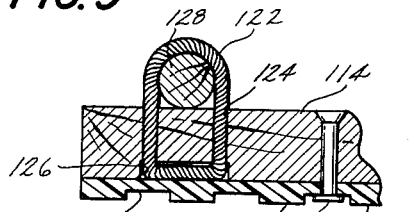
FIGURE 9 is a fragmentary sectional view along the line 9—9 of FIGURE 8.
Figure 10:
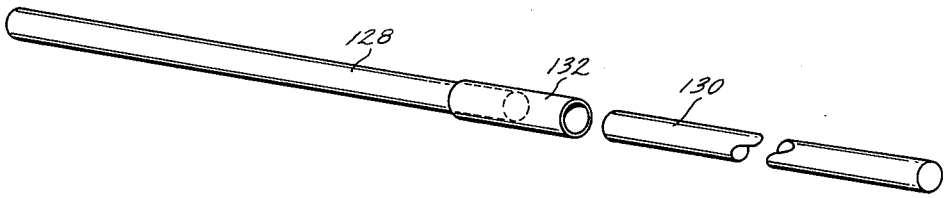
FIGURE 10 is a fragmentary exploded perspective view of a longitudinal stiffening member of FIGURES 7-9.

The rigidifying means generally designated by the numeral 112 includes the transverse stiffening ribs 114 secured directly to the body portion 110 by rivets 116 and a pair of removable longitudinal stiffening members 118, 120 extending along the sides of the body portion 110. When the snow vehicle is unrolled into a flattened position for use, the stiffening members 118, 120 may be quickly and easily inserted through the loops 122 mounted adjacent the ends of the transverse ribs 114. The loops 122 preferably are of a fibrous, leather-like or other strong but flexible material so that they they will fold over to allow ready rolling of the snow vehicle. Conveniently, they may be fabricated from synthetic fiber rope such as nylon for strength and long life. As shown in FIGURE 9, the loops 122 may be conveniently mounted on the ribs 114 by passing them through a pair of apertures 124 in the ribs 114 and seating them in a groove 126 in the bottom surface of the ribs 114 permitting the ribs to lie flush against the body portion 110. As will be readily appreciated, the longitudinal stiffener members 118, 120 serve as handles, thus obviating the need for rope elements such as in the embodiment of FIGURES 1–5.

To provide a relatively compact unit for portage, the stiffening members 118, 120 are comprised of two elements 128, 130 conveniently formed of wood or tubular metal stock, joined together by a metal sleeve 132. The sleeve 132 is secured on the end of element 128 and is adapted to receive tightly but removably the end of the element 130 to form the rigid member.

The highly advantageous snow vehicle of this embodiment enjoys still further versatility in that the use of jointed stiffener members 118, 120 enables the snow vehicle to serve as an emergency shelter. With the stiffener members inserted through the loops 122 and disjointed, the snow vehicle may be folded adjacent its midpoint to form a small but rugged A-frame. A plurality of folded snow vehicles in side-by-side relationship increases the length of the shelter, and the essentially triangular open ends may be readily enclosed with canvas or other material to complete a fully serviceable emergency shelter.

The highly versatile and practical snow vehicle of the present invention makes an important contribution to snow transportation generally and snow rescue work in particular. The snow vehicle easily and quickly rolls up into a compact, lightweight unit which may be conveniently carried on the back of an individual on skis or snowshoes such as ski patrol or search party members. The unit may be quickly rolled out and flattened for use and, if desired, may be made transversely rigid without impairing longitudinal flexibility. Moreover, it may be quickly made longitudinally rigid by easily removable stiffeners which may be disassembled for convenient packing and portage. In an emergency, the snow vehicle is readily adapted to use as a shelter. The relative simplicity of the structure makes the snow vehicle relatively easy and economical to manufacture, as well as rugged in use.

Having thus described the invention, I claim:

1. A snow vehicle having a self-forming curved-up tip portion extending across the front end thereof, said tip portion being preformed and being self-retaining in its curved-up configuration during operative assembly and an integrally formed, elongated body portion of synthetic plastic sheet material, extending rearwardly from said tip portion and said plastic sheet material having a relatively high degree of flexibility and impact resistance at temperatures below 0 degrees centigrade, said curved-up tip portion being integrally formed with the plastic sheet material of said body portion and comprising a reversely curved end portion of the sheet material fastened to said body portion to provide a closed, substantially cylindrical end portion, said body portion being rollable upon itself and said tip portion into a compact unit for portage and readily flattenable upon unrolling.

2. The snow vehicle of claim 1 wherein said synthetic plastic is polycarbonate.

3. The snow vehicle of claim 1 wherein said body portion has a plurality of longitudinally extending grooves on its bottom surface.

4. A snow vehicle having a self-forming curved-up tip portion extending across the front end thereof, said tip portion being preformed and being self-retaining in its curved-up configuration during operative assembly and an integrally formed, elongated body portion of synthetic plastic sheet material extending rearwardly from said tip portion and having a relatively high degree of flexibility and impact resistance at temperatures below 0 degrees centigrade, said body portion having rigidifyng means along the length of the upper surface thereof including longitudinally extending removable stiffening members for imparting longitudinal rigidity to said body portion of said snow vehicle and a plurality of relatively rigid stiffening ribs extending transversely of the vehicle in longitudally spaced-apart relationship rigidifying said body portion across substantially the entire width thereof, said body portion being rollable upon itself and said tip portion into a compact unit for portage and readily flattenable upon unrolling.

5. The snow vehicle of claim 4 wherein said synthetic plastic is polycarbonate sheet having a thickness of about 20 to 50 mils.

6. The snow vehicle of claim 4 wherein said body portion has a plurality of longitudinally extending grooves on its bottom surface.

7. A snow vehicle having a self-forming curved-up tip portion extending across the front end thereof, said tip portion being preformed and being self-retaining in its curved-up configuration during operative assembly; an integrally formed, elongated body portion of snythetic plastic sheet material extending rearwardly from said tip portion and having a relatively high degree of flexibility and impact resistance at temperatures below 0 degrees centigrade, said body portion having a plurality of longitudinally extending grooves on its bottom surface; rigidifying means on the upper surface of said body portion including removable stiffening members extending longitudinally of said body portion for imparting longitudinal rigidity thereto and a plurality of transversely disposed relatively rigid stiffening ribs in longitudinally spaced-apart relationship rigidifying said body portion across substantially the entire width thereof; means securing said rigidifying means to said body portion; and gripping means on the upper surface extending longitudinally along the sides of said body portion, said body portion and rigidifying means being readily rollable upon themselves and said tip portion into a compact unit for portage and readily flattenable upon unrolling.

8. The snow vehicle of claim 7 wherein said synthetic plastic is polycarbonate sheet of 20 to 50 mils thickness.

9. A snow vehicle having a self-forming curved-up tip portion extending across the front end thereof, said tip portion being preformed and being self-retaining in its curved-up configuration during operative assembly; an integrally formed, elongated body portion of synthetic plastic sheet material extending rearwardly from said tip portion and having a relatively high degree of flexibility and impact resistance at temperatures below 0 degrees centigrade, said curved-up tip portion and said body portion being integrally formed from a single length of said synthetic plastic sheet material with one end thereof reversely curved and fastened to said body portion to provide a closed, substantially cylindrical end portion, said body portion having a plurality of longitudinally extending grooves on its bottom surface; rigidifying means on the upper surface of said body portion including a plurality of transversely disposed relatively rigid stiffening ribs in longitudinally spaced-apart relationship rigidifying said body portion across substantially the entire width thereof; means securing said rigidifying means to said body portion; and gripping means on the upper surface extending longitudinally along the sides of said body portion, said body portion and rigidifying means being readily rollable upon themselves and said tip portion into a compact unit for portage and readily flattenable upon unrolling.

10. The snow vehicle of claim 9 wherein the end of said tip portion is secured to a rigid transverse member and thereby to said body portion.

11. A snow vehicle having a self-forming curved-up tip portion extending across the front end thereof, said tip portion being preformed and being self-retaining in its curved-up configuration during operative assembly; an integrally formed, elongated body portion of synthetic plastic sheet material extending rearwardly from said tip portion and having a relatively high degree of flexibility and impact resistance at temperatures below 0 degrees centigrade, said body portion having a plurality of longitudinally extending grooves on its bottom surface; rigidifying means on the upper surface of said body portion including a plurality of transversely disposed relatively rigid stiffening ribs in longitudinally spaced-apart relationship rigidifying said body portion across substantially the entire width thereof and flexible straps connecting such transverse stiffening ribs to provide a flexible mat; means securing said rigidifying means to said body portion; and gripping means on the upper surface extending longitudinally along the sides of said body portion, said body portion and rigidifying means being readily rollable upon themselves and said tip portion into a compact unit for portage and readily flattenable upon unrolling.

12. A snow vehicle having a self-forming curved-up tip portion extending across the front end thereof, said tip portion being preformed and being self-retaining in its curve-up configuration during operative assembly and an integrally formed, elongated body portion of synthetic plastic sheet material extending rearwardly from said tip portion and, said plastic sheet material having a relatively high degree of flexibility and impact resistance at temperatures below 0 degrees centigrade, said curved-up tip portion being provided by a substantially rigid member of curvilinear configuration extending across the front end of said snow vehicle and to which said plastic sheet material of said body portion is secured, said body portion being rollable upon itself and said tip portion into a compact unit for portage and readily flattenable upon unrolling.

13. The snow vehicle of claim 12 wherein said synthetic plastic is polycarbonate.

14. The snow vehicle of claim 12 wherein said body portion has a plurality of longitudinally extending grooves on its bottom surface.

15. A snow vehicle having a self-forming curved-up tip portion extending across the front end thereof, said tip portion being preformed and being self-retaining in its curved-up configuration during operative assembly; an integrally formed, elongated body portion of synthetic plastic sheet material extending rearwardly from said tip portion and having a relatively high degree of flexibility and impact resistance at temperatures below 0 degrees centigrade, said curved-up tip portion being provided by a substantially rigid member of curvilinear configuration extending across the front end of said snow vehicle and to which said plastic sheet material of said body portion is secured, said body portion having a plurality of longitudinally extending grooves on its bottom surface; rigidifying means on the upper surface of said body portion including a plurality of transversely disposed relatively rigid stiffening ribs in longitudinally spaced-apart relationship rigidifying said body portion across substantially the entire width thereof; means securing said rigidifying means to said body portion; and gripping means on the upper surface extending longitudinally along the sides of said body portion, said body portion and rigidifying means being readily rollable upon themselves and said tip portion into a compact unit for portage and readily flattenable upon unrolling.

References Cited by the Examiner

UNITED STATES PATENTS

| 354,947 | 12/86 | Stearns | 280—18 |
| 359,736 | 3/87 | Migeon | 280—18 |
| 2,469,765 | 5/49 | Fish | 280—18 |
| 3,034,800 | 5/62 | Campbell | 280—18 |
| 3,140,878 | 7/64 | Davis | 280—18 |

FOREIGN PATENTS 229,626   1/44   Switzerland.

OTHER REFERENCES

Publication: "Polycarbonate Resins," Thompson et al., Modern Plastics, volume 35 (1948), pages 131–132, 134–136, 138, 218, 221.

ARTHUR L. LA POINT, *Primary Examiner.*